United States Patent [19]

Sudama et al.

[11] Patent Number: 4,791,566
[45] Date of Patent: Dec. 13, 1988

[54] TERMINAL DEVICE SESSION MANAGEMENT PROTOCOL

[75] Inventors: Ram Sudama, Concord; Thomas C. Porcher, Stow, both of Mass.; Jerrold S. Leichter, New Haven, Conn.

[73] Assignee: Digital Equipment Corporation, Maynard, Mass.

[21] Appl. No.: 32,152

[22] Filed: Mar. 27, 1987

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS

| 4,348,739 | 9/1982 | Deaver et al. | 364/900 |
|---|---|---|---|
| 4,586,134 | 4/1986 | Norstedt | 364/200 |
| 4,642,758 | 2/1987 | Teng | 364/200 |
| 4,642,790 | 2/1987 | Minshull et al. | 364/900 |
| 4,677,616 | 6/1987 | Franklin | 370/94 |
| 4,679,189 | 7/1987 | Olson et al. | 370/60 |
| 4,694,396 | 9/1987 | Weisshaar et al. | 364/300 |
| 4,734,853 | 3/1988 | Nakano | 364/200 |
| 4,754,395 | 6/1988 | Weisshaar et al. | 364/200 |

OTHER PUBLICATIONS

Stallings, William, "Data and Computer Communications", MacMillin Publishing Co., 1985, pp. 477–528.
Gray, James, "Protocols & Techniques for Data Communications", Prentice-Hall, 1981, pp. 44–45 & 344–352.
Pike, R., The UNIX System: "The Blit:A Multiplexed Graphics Technical", AT&T Bell Laboratories Technical Journal, vol. 63, No. 8, Oct. 1984, pp. 1607–1631.
Held, Gilbert et al., "Data Communications", 1983, pp. 244–249.

Primary Examiner—Gareth D. Shaw
Assistant Examiner—Kevin Kriess
Attorney, Agent, or Firm—Nutter, McClennen & Fish

[57] ABSTRACT

The invention provides a new and improved system for transferring information between a host system and a terminal system. A digital data processing system includes a host computer system which runs processors and a terminal system which is connected to the application host computer system over a communication link. The terminal system includes one or more virtual terminals each of which allows an operator to enter information and allows output information to be displayed. The association between a terminal device and an application process is a session. Initially, a session is selected by means of a command transferred over the communications link. Thereafter, information, associated with the selected session, may be transferred over the communication link. This may continue until another session is selected. This transfer system minimizes the amount of control information which is required to identify the particular session with which data being transmitted over the communications link is associated. Once a session is selected, it remains selected until another session is selected, after which the data transmitted is associated with the newly selected session.

23 Claims, 6 Drawing Sheets

TERMINAL DEVICE SESSION MANAGEMENT PROTOCOL

FIELD OF THE INVENTION

This invention relates generally to the field of digital data processing systems, and more specifically to a terminal device which employs a session management protocol that allows one or more operators to selectively access and use several application processes over a single communications link.

BACKGROUND OF THE INVENTION

As computers have become more sophisticated, it has become possible to run two or more programs, or application processes, concurrently on a single computer system. This capability, known as multitasking, or multi-programming, has been made possible by the development of large, very fast, processors that can switch between programs either at selected intervals, or when some event happens in the system, such as data transfer to or from a mass storage device, which does not require processor time. More recently, networks of smaller computers have permitted slower computers to be linked together to allow the sharing of programs and data to achieve concurrent processing.

Since computer systems can run multiple application processes concurrently, their users now find it desirable to be able to frequently switch between two or more processes that are running on the system. For instance, personnel in a manufacturing facility may want to selectively monitor and control different manufacturing steps that may be controlled by the system. Personnel in a financial office may want to access to records of the most recent transactions, records of past transactions, and also to send and receive electronic mail. Typically, a user's access to a computer system is through a single component or virtual terminal that comprises a video display-keyboard combination, such as a word processing station, or a personal computer connected to the primary system.

Another advantage of a computer system's ability to run a number of application processes concurrently is that it has become possible to connect a component to the system which may have selective access to all of the processes running on the system. For instance, it may be desirable to connect to the system an intelligent printer which can select the order of printing among a number of print requests presented to it. Alternatively, a master processor may be connected to the system to monitor the processes running on a number of slave processors so as to control all the processes running on the system.

The processor units, terminals and other components of many computer systems are often connected together by a single communications link. Typically, these components are connected to each other by a common bus. Connecting components in this manner minimizes the number of input/output ports that each component has to be provided with, and also reduces the number of communications links needed to connect all the components together.

Frequently there is a need to provide the virtual terminals that are part of a computer system with a means to rapidly access the programs running on the system. This access function, or switching capablity enables the virtual terminal's user to selectively monitor the processes and specifically receive processed data therefrom, and to transmit inforamtion in the form of data to be processed, or commands for processing the data to the process being monitored. Typically, a switching protocol is provided so information may be selectively transmitted or received from the different processes running on the system over the single communications link to and from the terminal device.

Currently, many computer systems use a packet-switching protocol wherein packets of information are sent to and from the terminal and other components that are part of the computer system. Each packet comprises a header field followed by an information field. The header field contains control information such as address information which identifies the intended recipient of information contained in the information field. For example, a user may have a virtual terminal set to observe, or "window" two programs operating on a system. Header fields in packets, transmitted from the system to the virtual terminal insure the displayed window contains data from the program being monitored in that window. In transmissions from the virtual terminal, the header fields identify the application processes to which the information is directed, and if necessary, the processor on which the process is running. Packet switching, thus, makes it possible to transmit information regarding multiple application processes over a single communications link.

However, there are limitations associated with packet switching. In each packet the information field must be preceded by a header field, and so the time required to transmit the header fields reduces the amunt of time during which information, whether data or program commands may be transmitted over the communications link. Moreover, the virtual terminals and the other system components must spend time generating header fields for transmitted packets, decoding header fields of received packets, and directing directing the flow of the information in the packets to the intended recipient.

SUMMARY OF THE INVENTION

The invention provides a new and improved system for transferring information between a host system and a terminal system in a digital data processing system.

In brief summary, a digital data processing system includes a host computer system which runs application processes and a terminal system which is connected to the host computer system over a communications link. The terminal system includes one or more virtual terminals each of which allows an operator to enter information for use by the application processes and allows output information from the processes to be displayed. The association between a terminal device and an application process is a session. Initially, a session is selected by means of a command transferred over the communications link. Thereafter, information, associated with the selected session, may be transferred over the communications link. This may continue until another session is selected. Command packets may be multiplexed with the information to be transferred to control other sessions without selecting another session.

The new information transfer system minimizes the amount of control information which is required to identify the particular session with which data being transmitted over the communications link is associated. This is because once a session is selected, it remains selected until another session is selected, after which the data transmitted is associated with the newly selected session. Since the amount of time control information must be sent is minimized, the amount of time available to send data is maximized.

BRIEF DESCRIPTION OF THE DRAWINGS

The invention is pointed out with with particularity in the appended claims. The above and further advantagesd of this invention may be better understood by references to the description taken in conjunction with the accompanying drawings, in which:

DETAILED DESCRIPTION OF THE PREFERRED EMBODIMENTS

Figure 1:
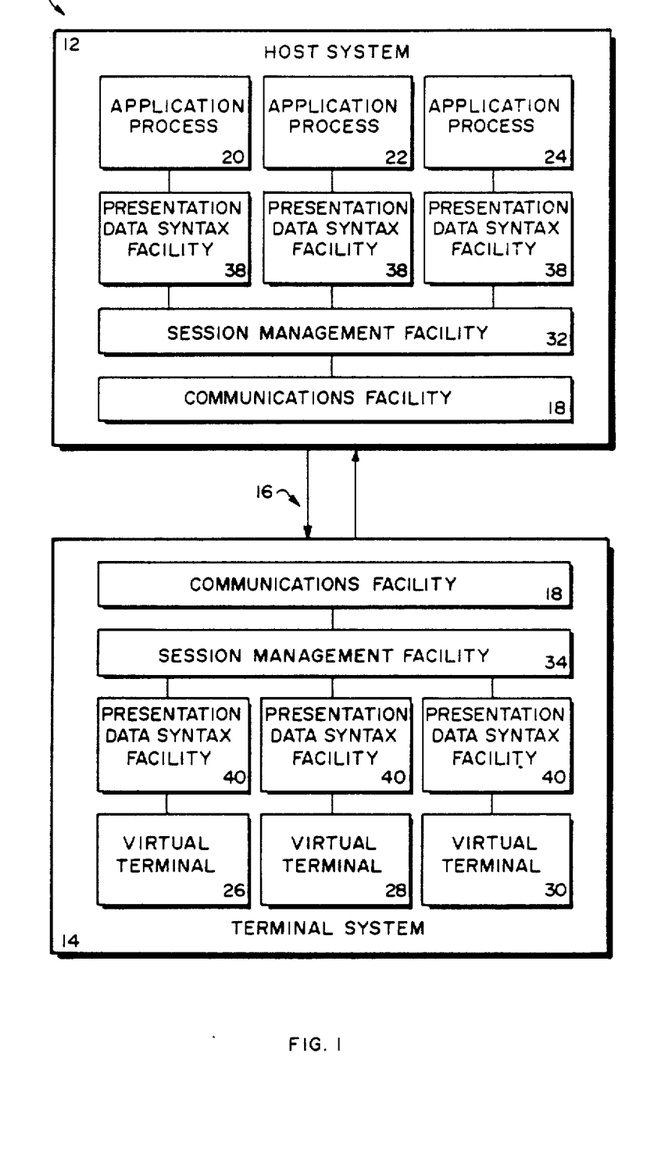
FIG. 1 is a general block diagram of a session management system implemented in accordance with this invention.

FIG. 1 depicts a system 10 comprising a host system 12 linked to a terminal system 14 by a single bi-directional communications link 16 such as a physical circuit. Both the host system 12 and terminal systems 14 have a communications facility 18 to encode and decode signals transmitted and received over the communications link 16. The communications facilities 18 may perform such functions as serializing parallel signals for transmission over the communications link 16; and formating serial signals received over the communications into a parallel format.

The host system 12 represents a computer system on which one or more programs, or application processes, 20, 22, and 24, may be concurrently running. The terminal system 14 includes one or more video terminals, or other terminal components represented by virtual terminals 26, 28, and 30. The virtual terminals 26, 28, and 30 may each selectively communicate with one or more application processes running on the host computer system 12. The application process-virtual terminal communication is over the communications link 16, which only allows a single information stream to be transferred in each direction between the host system 12 and the terminal system 14.

The communications link 16 typically allows two-way communication, thus both the host system 12 and terminal system 14 may constitute a transmitter or a receiver. If information is sent from a application process 20, 22, or 24 to a virtual terminal 26, 28, or 30, the host system 12 will operate in a transmitting mode and the terminal system 14 will operate in a receiving mode. If the flow of information is in the opposite direction, then so are the operating modes of the host system 12 and terminal system 14. Thus, throughout this description and the application of the protocol, either the host or terminal system 12, 14 will function as the transmitting system, and the other system will be the receiving system. In a typical environment the communications link 16 is fully duplexed so both the host system 12 and the terminal system 14 can transmit and receive information at the same time.

Using a terminal device session management protocol described herein, the host system 12 and terminal system 14 selectively transmit information between the application processes 20, 22, 24 and the virtual terminals 26, 28, 30 over the communications link 16. For example, virtual terminal 28 may be a video terminal used to monitor application processes 22 and 24. Using the session management protocol, the terminal user may select the process 22 or 24 with which it exchanges information. Alternatively, virtual terminal 30 may be an intelligent printer which accepts print requests from all the application processes 20, 22, and 24, establishes a priority for them, and prints the print request with the highest priority.

Session managment facilities 32 and 34 which are each part of the the host system 12 and terminal system 14 respectively, control the flow of information between the application processes 20, 22, 24 and the virtual terminals 26, 28, 30 in accordance with the session managment protocol. The host system session management facility 32 maintains a mapping of the relationships, called sessions, between the application processes 20, 22, 24 and the virtual terminals 26, 28, 30. When information is sent from one of the virtual terminals to one of the application processes, the facility 32 identifies a session and transfers the approriate application process 20, 22, or 26. The terminal system session management facility 34 maintains a similar set of mappings for when information is sent from one of the application processes 26, 28, or 30 to one of the virtual terminals 20, 22, or 24. As will be discussed hereinafter, the system transmitting information selects a specific session to be active depending on where it wants the information directed. Selecting a session is, in effect, accessing a component through time division multiplexing with random accessing so information will be directed to it until another component is selected.

After a session has been selected, flow control is used to insure that the receiving system's capacity to buffer information is not exceeded by the transmitting system's ability to send it. The system that is receiving the information forwards a selected number of transmit credits to the system that is sending the information. The number of transmit credits are representative of the amount of information the receiving system can accept. As the transmitting system forwards the information, it reduces the number of transmit credits available. When the number of transmit credits is reduced to a selected value, the transmitting system stops forwarding information until it receives additional transmit credits from the receiving system. This insures that the transmitting system never sends a more information than the receiving system can accept. This transmission credit scheme is bi-directional, that is transmit credits can be sent in two directions and the rate of flow of information in one direction is independent of the rate of flow of information in the opposite direction.

Figure 2:
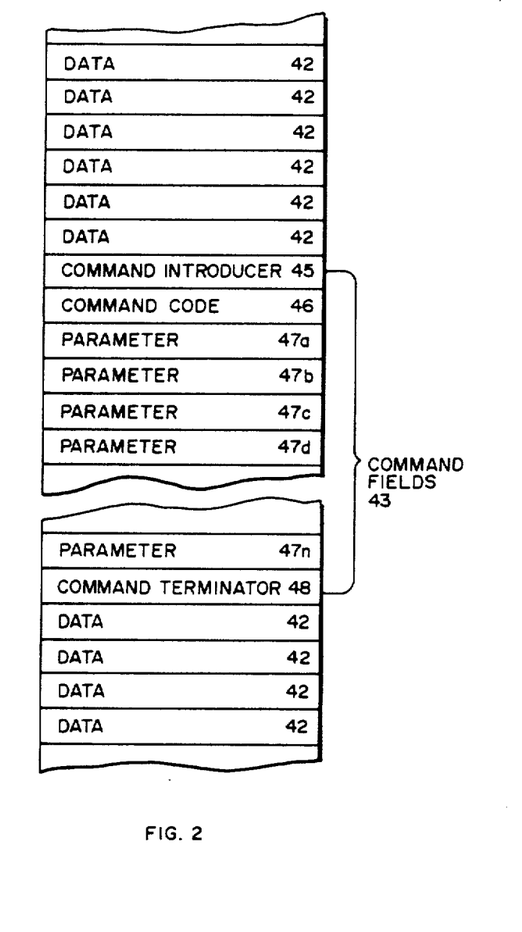
FIG. 2 is a diagram depicting the structure of the information transmitted between the host and terminal systems in accordance with this protocol.

FIG. 2 depicts the format of information sent over the communications link 16 after communications have been established. The information includes data fields 42 with command fields 43 interspersed therebetween. The data fields 42 comprise the information transmitted between the virtual terminals 26, 28, 30 and the application processes 20, 22, 24. All information relating to the applcation processes on the host system 12, including actual data and program commands, is transfered over the communications link 16 in the data fields 42.

The command fields 43 contain protocol information needed to operate the session managment in accordance with this protocol. The protocol information includes, for example, the commands used to initiate and select a session and extend transmit credits, all of which will be discussed in more detail hereinafter. The command fields 43 are inserted into the information stream by the session managment facility 38 or 40 transmitting them. The command fields 43 are removed by the receiving session management facility 40 or 38 prior to its coupling the contents of the data fields 42 to the receiving virtual terminal 26, 28, or 30 or application process 20, 22, or 24.

A command introducer field 45 is the first command field 43. This field is sent to the receiving session managment facility 32 or 34 to indicate the start of a protocol command. Following the command introducer field 45 is an operation code field 46 which identifies the protocol command being sent. One or more parameter fields 47a, b, . . . , (generally identified by reference number 47,) may follow the command operation code field 46. The parameter fields 47 contain information necessary to execute the command. A command terminator field 48 is the last of the command fields 43. The command terminator field 48 indicates to the receiving session managment facility 32 or 34 that the transmission of the current protocol command has been completed, and subsequent information will comprise either an additional protocol command, or information that should be coupled to the receiving application process 20, 22, or 24 or virtual teminal 26, 28, or 30.

With this background, the operation of the session managment protocol will now be described in more detail. Between each application process 20, 22, 24 and the host session management facility 32, there is a presentation data syntax facility 38 and between each terminal device 26, 28, 32 and the terminal session management facility 34, there is a presentation data syntax facility 40. The presentation data syntax facilities 38 and 40 encode and decode information that is transmitted through them between the session management facility 32 or 34 and the associated application processes 20, 22, 24 or virtual terminals 26, 28, 30. Information is intially transmitted to the session management facility through the presentation data syntax facility 38 or 40, wherein it is encoded into a format recognizable by the session managment facility. The transmitting session managemt facility forwards the encoded information over the communication link 16 to the receiving session management facility. The receiving session management facility then forwards the information to the receiving presentation data syntax facility wherein it is decoded into its original format recognizable by the receiving application process 20, 22, 24 or virtual terminal 26, 28, 30.

In one embodiment of the invention, the presentation data syntax facilities 38 and 40 format the information according to a "column/row" syntax defined by ANSI standard 3.4. Characters are identified by the individual elements of a 16 row by 16 column bit array. The elements of the array are defined by their column and row location. The columns and rows are both numbered 0–15 so the first element in the array is 0/0 and the last is 15/15. For example, a character in columns 2 and row 3 would be identified as 2/3. The format for any character can be determined by multiplying the column value by shifts left by 4 and adding the row. Thus, the character 2/3 would have the syntax code of $35=(2\times 16)+3$, and would be transmitted in binary as 00100011. This syntax allows 256 different characters to be transmitted between the systems.

When the session management protocol has been implemented between the host and terminal systems 12, 14, all the information that passes between the applications processes 20, 22, 24 and ther virtual terminals 26, 28, 30 over the communications link 16 is in this format regardless of whether the protocol is in an OFF state, or the active protocol, ENABLED, that controls the flow if information over the communications link.

In accordance with the session management protocol, host system 12 and terminal system 14 may each be in one of four possible states; namely:

(1) OFF. In this state, the session management protocol is not used to control the flow of information between the host system 12 and terminal system 14. Other protocols may be used to control the flow of information between the application processes 20, 22, 24 and the virtual terminals 26, 28, 30 over the communications link 16.

(2) PENDING. In this state, the session management protocol is used to control the communcation link 16. However, the only commands the host system 12 and terminal systems 14 will recognize and act on are ENABLE, DISABLE, and REPORT-SESSION, each of which will be discussed hereinafter.

(3) ENABLED, INACTIVE. In this state, the flow of information over the communication link 16 is controled by the session managemant facilities 32, 34 in accordance with the session managment protocol. However, the transmitting system has not selected a session to receive transmitted information. Since no session has been selected, the receiving system will discard all information sent until one is selected.

(4) ENABLED, ACTIVE. In this state, the flow of information over the communications link 16 is controlled in accordance with the session managment protocol. The information is sent from the transmitting system over the communications link 16 and is directed by the session managment facility 34 or 32 in the receiving system to the appropriate application process 20, 22, 24 or virtual terminal 26, 28, 30.

The transition out of the OFF state is through the PENDING state. Transitions into and out of the OFF state are enabled by local requests originating from within host system 12 or to terminal system 14. Alternatively, the host system 12 or terminal system 14 may request the other system to execute such a transition. This insures that a system requested to operate session management in accordance with this protocol is not forced to do so unless its user desires such operation.

Transitions from the PENDING to the ENABLED, INACTIVE state occur as a result of requests transmitted over the communications link 16. The host system 12 usually initiates this transition by transmitting an ENABLE command to the terminal system 14 to start and enabling sequence, discussed in detail hereinafter. Normally, the terminal system 14 is not used to initiate an anabling sequence. However, the terminal system is usually has the capability of expressly intiating this transition.

After the session management protocol passes into the ENABLED, INACTIVE state, sessions can be opened, and one open session selected to receive information in later transmitted data field. Once a session has been selected, the session management facilities 32, 34 are both in the ENABLED, ACTIVE state with respect to this protocol, and information in the form of the data fields 42 will be transfered between the application processes 20, 22, 24 and the virtual terminals 26, 28, 30 in accordance with this protocol.

Sessions may be selected in either a blocking or a non-blocking mode. In the blocking mode, the same session is selected in both directions over the communications link 16. In other words, the application process 20, 22, 24 that terminals information to a virtual terminal 26, 28, 30 also receives information from the same application process.

In the non-blocking mode, sessions do not have to be the same. The information travelling in opposite directions over the communications link 16 can be transmitted between different application processes 20, 22, 24 and virtual terminals 26, 28, 30. Also, this allows options such as the transmission of the same information from a application process 20, 22, or 24 to multiple virtual terminals 26, 28, 30 and transmission of a information in the opposite direction from only one virtual terminal back to the application process. Generally, whether the session management protocol is operated in the blocking or non-blocking mode is a function of the capabilities of the host systems 12 and terminal systems 14 to control multiple active processes.

A more complete understanding of the session management protocol may be gained by reference to FIGS. 3–8 which depict the specific protocol commands that are transmitted between the session management facilities 32, 34 to control the flow of information between the host system 12 and terminal system 14.

Figure 3:
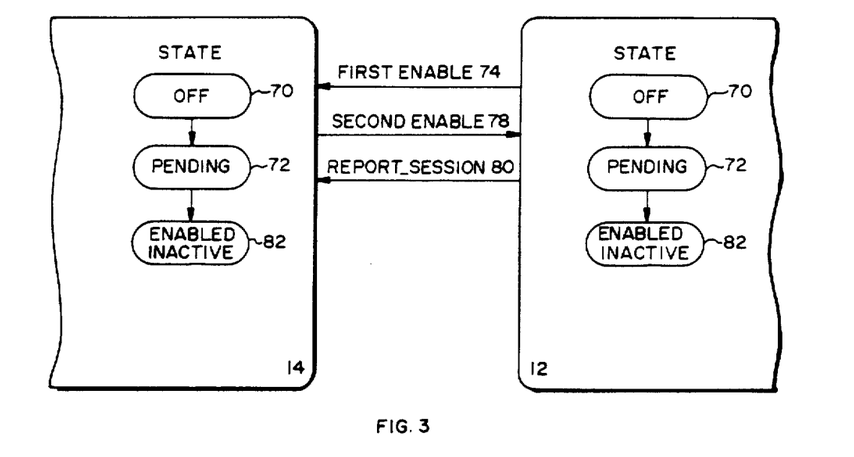
FIGS. 3 through 8 comprise diagrams depicting transfer of several of the comands transmitted between the systems depicted in FIG. 1 in accordance with this protrocol.

FIG. 3 illustrates the sequence of commands used to transfer from the OFF state 70 to the ENABLED, INACTIVE state 32. Both the host system 12 and the terminal system 14 are initially in the OFF state 70 and pass into a PENDING state 72 in response to a local request. The host system session managment facility 32 may take this transition in response to a request from one of the application processes 20, 22, or 24, or automatically in response to the activation of the terminal system 14. The terminal system session management facility 34 may only make this transistion in response to a specific command from one of the virtual terminals 26, 28, 30. If one of the virtual terminals is a video display, the request may come from a command the user manually enters through the keyboard 26, 28, or 30.

After host system 12 and terminal system 14 are both in the PENDING state 72, the host system 12 may initiate the enabling sequence by transmitting an initiating ENABLE command 74. The terminal system 14 responds with an acknowledging ENABLE command 78, that includes an Enable State parameter, in one of the parameter fields 47, (FIG. 2,) indicating it is not currently in the ENABLE state. The host system responds to the second ENABLE 78 with a REPORT13 SESSION command 80 with a Status parameter, in one of the parameter fields 47, indicating whether or not it can support the specific version of the session management protocol the terminal system is using. Both systems then pass into the ENABLED, INACTIVE state 82.

During this exchange both systems transmit Version Number and Session Limit parameters, in the parameter fields 47, (FIG. 2,) following the Enable State parameters. The Version Number parameter indicates which version of the protocol the transmitting system 12 or 14 has. The Session Limit parameter indicates the maximum number of sessions it can concurrently support.

Figure 4:
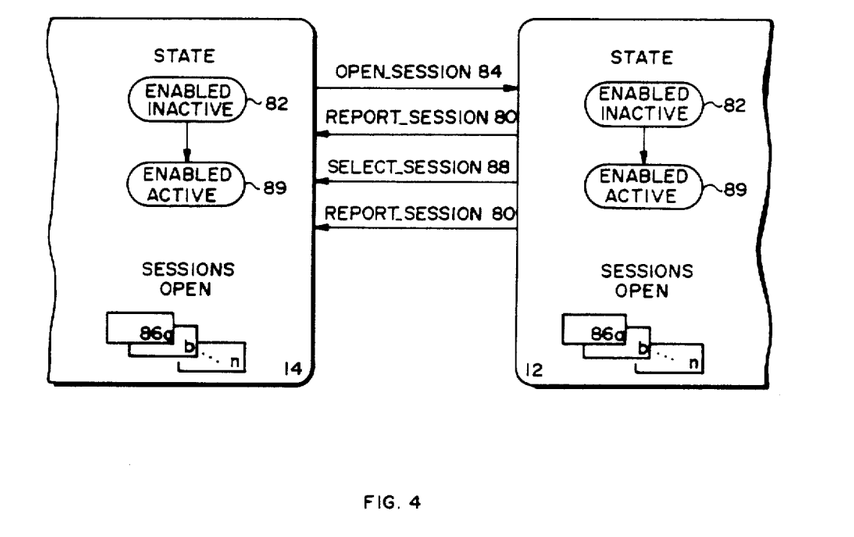

After the host system 12 and terminal system 14 are in the ENABLED, INACTIVE state 82 with respect to this protocol, individual sessions 86a, b . . . n can be established, or opened, and one of the open sessions 86a, b . . . n selected as the one through which data fields 42 are sent, as is illustrated by FIG. 4. Either the host system 12 or terminal system 14 may open a session 86a, b . . . n by sending an OPEN_SESSION command 84 to the other. A Session ID parameter, in parameter fields 47, (FIG. 2,) is sent with each OPEN_SESSION command to identify the session opened. The receiving system will then respond to the OPEN_SESSION command 84 with a REPORT_SESSION 80 indicating whether or not the session 86a, b, . . . n was successfully opened.

If the OPEN_SESSION command 84 was sent to a receiving system which has more than one application process 20, 22, 24 or with more than one virtual terminal 26, 28, 30, an Application Name parameter, and a Session Management parameter may be sent with the command in the parameter fields 47, (FIG. 2,) following the Session ID parameter. These parameters are used by the session managment facility 32 or 34 receiving the OPEN_SESSION command 84 to assign the session to the appropriate application process 20, 22, or 24, or virtual terminal 26, 28, or 30 and are not part of this invention. If these parameters are not sent with the OPEN_SESSION command 84, the receiving session management facilty 32 or 34 should have means for automatically assigning the sessions 86 so the information is directed to the appropriate destination.

After one or more sessions 86 have been opened, one may be selected to be active over the communications link 16. If the link is fully duplexed, and the session management facilities 32, 34 can operate in the non-blocking mode, different sessions can be selected in each direction along the link. The system that has information to transmit to a session 86a, b, . . . n initiates the selection process by transmitting a SELECT_SESSION command 88. A Session ID parameter identifing the session selected to be active is sent with this command in the parameter fields 47, (FIG. 2.) After the system receiving the SELECT_SESSION command 88 has completed the session selection process, it sends a REPORT_SESSION command 80 to the transmitting system. After a session 86a, b . . . n has been selected to receive a character the systems are said to be in the ENABLED, ACTIVE state 89. The selected open session stays active until another one is selected.

Figure 5:
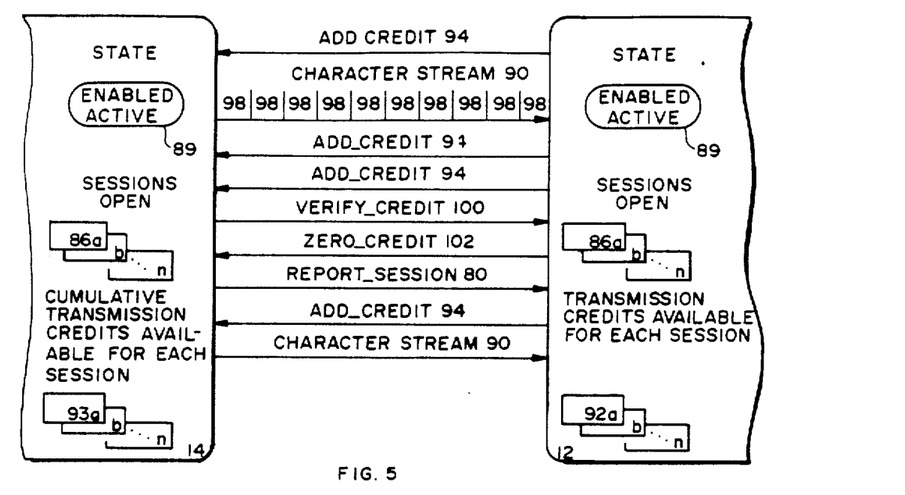

In order to forward data fields 42 between the host system 12 and the terminal system 14 in accordance with this protocol, the transmitting system the data fields must first receive transmit credits 92a, b . . . n from the receiving system. When a session is 86a, b, . . . n is first opened there are zero transmit credits. The receiving system sends an ADD_CREDIT command 94 to the transmitting system, as represented in FIG. 5, indicating the amount of buffer capacity it has available to store transmitted information. Transmitted with the ADD_CREDIT command 94, in the parameter fields 47, (FIG. 2,) is a Session ID parameter for identifying the session 86a, b, . . . n, and a Transmit Credit parameter 93 that indicates the amount of storage capacity for that session. No response is required for this command and the transmitting system may send information, in data fields 42 (FIG. 2), as soon as it receives the credits 92.

In one embodiment of the invention, the transmit credits 92a, b, ... or n are representative of the number of bytes of information the system receiving the data fields 42 can buffer. For each byte of data transmitted is data field 42, the transmitting system deducts one from the transmit credits 92 available in a storage location within its session management facility, for that session which were provided by the received ADD-CREDIT message.

At any time, the receiving system can send additional transmit credits 92 to the transmitting session by transmitting additional ADD-CREDIT commands 94. The transmission of the additional ADD_CREDIT commands 94 by a system does not interrupt its reception of data fields 42 that has been transmitted to it. The system receiving an ADD_CREDIT command 94 adds the additional transmit credits 92 received to those previously already in the storage location for that particular session.

It will be appreciated that if either the host system 12 or terminal system 14 receiving data fields 42 wait until the system transmitting it has zero available transmit credits 92a, b, ... n, the flow of data fields 42 would be "stuttered" since the transmitting system waits until the receiving system has sent credits before restarting the flow of information. This may be an undesirable conduction, and thus in order to avoid it is recommended the receiving system send transmit credits 92 before the transmitting system's stored credits reach an a set minimum amount.

Moreover, some systems may transmit data fields 42 by the buffer, and will not forward the contents of a partially-full buffer if it cannot forward its entire contents. Thus, it is recommended that a minimum number of transmit credits 92a, b, ... n be whenever information is to be received and an ADD_CREDIT command 94 sent.

If the system transmitting information has more information to send than available transmission credits 92a, b ... or n, or if an ADD_CREDIT command 94 is garbled, such as may happen if either the Transmit Credit or Session ID parameters are lost, the the transmitting system may send a VERIFY_CREDIT command 100 with a Session ID parameter in the parameter fields 47, (FIG. 2,) identifying the specific session that needs resynchronization of transmit credits. The receiving system responds by sending a ZERO_CREDIT command 102 with a Session ID parameter in the parameter fields 47 for tht session. This command zeros the available transmit credits 92a, b ... n the transmitting system has in storage. The transmitting system responds with a REPORT_SESSION command 80. After the REPORT_SESSION is received, the receiving system 14 or 12 can again send transmit credits 92a, b, ... n by way of additional ADD_CREDIT commands 94. As soon as the transmitting system receives the transmit credits 92a, b, ... n, it may start to transmit information in data fields 42 again.

Figure 6:
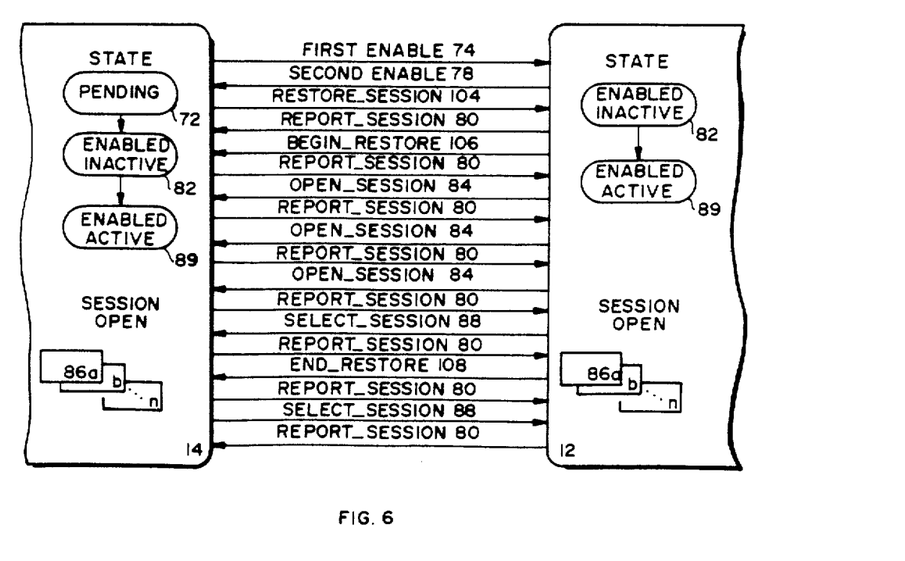

Session management in accordance with the protocol also provides a means for the warm restart of either the host system 12 or the terminal system 14 if one of them has lost session management information. This may occur when the system is temporarily disabled, such as may happen due to a power failure or operator error. As illustrated by FIG. 6, the "cold" system that lost information, and is in the PENDING state 72, initiates the process by sending an ENABLE command 74 to the warm system in order to intiate the enabling process.

The second, "warm," system responds with a second, acknowledging, ENABLE command 78 with an Enable State parameter indicating that it was already in the ENABLE, INACTIVE state 82. The cold system responds to the Second ENABLE command 78 by transfering into the ENABLED, INACTIVE state 82 and transmitting a RESTORE_SESSION command 104 requesting that the warm system initialize the restore sequence. The warm system acknowledges this command with a REPORT_SESSION command 80.

The warm system starts the restore sequence with a BEGIN_RESTORE command 106 that signals the initiation of the restore sequence. The cold system responds with a REPORT_SESSION command 80. After the RESTORE_SESSION is received, the warm system responds with an open session sequence for each existing session 86. The warm system will also transmit a SELECT_SESSION command 88 inorder to start transmitting data fields 42 to a selected application process 20, 22, or 24, or virtual terminal 26, 28, 30. After the cold system has completed to the select session process, and trasmitted a a REPORT_SESSION command 80 as disclosed in the description of the select session process, the warm system will send an END_RESTORE command 108 indicating the completion of the restoration process. The restored system acknowledges the END_RESTORE command 108 with a REPORT_SESSION command. After the restoration is complete, the restored system 12 or 14 may transmit a SELECT_SESSION command 88 for the session it will be active to transmit to. Thus, at the end of the restore sessions sequence both systems 12, 14 are in the ENABLED, ACTIVE state 89.

Figure 7:
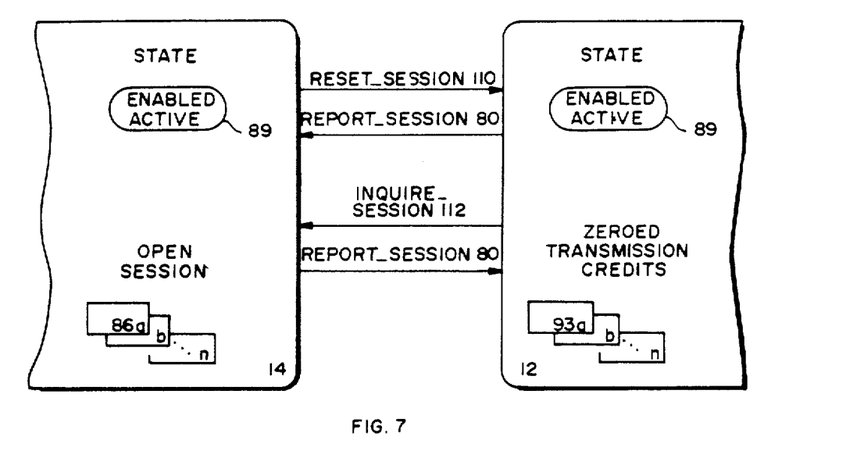

A RESET_SESSION command 110, and an INQUIRE_SESSION command are also provided as illustrated by FIG. 7. The RESET_SESSION command 110 is used to direct the receiving system to flush all existing buffers and zero the available transmit credits 92a, b, ... n for either a specific session 86a, b ... n or all sessions, depending on the Session ID parameter transmitted with the command in the parameter fields 47, (FIG. 2.) Also, the transmit credits 92 will be zeroed and buffers flushed for either the selected session 86a, b, ... n, or all all open sessions. This command may be used to reset the session management connections between the host system 12 and the terminal system 14 without having to close and reopen the existing open sessions. It may be used, for example, when the physical link forming the communications link 16 is temporarily broken and then reestablished, and the information in the buffers is no longer relevant to the current flow of information etween the application processes 20, 22, 24 and the virtual terminals 26, 28, 30. A Session ID parameter is transmitted in the parameter fields 47 with this command to identify the sessions 86a, b, ... or n to be reset. After a system has completed the reset session process, it transmits a REPORT_SESSION command 80.

The INQUIRE_STATUS command 112 is used to prompt the receiving system to send a REPORT_SESSION command 80 indicating whether a particular session 86a, b, ... n is open.

Figure 8:
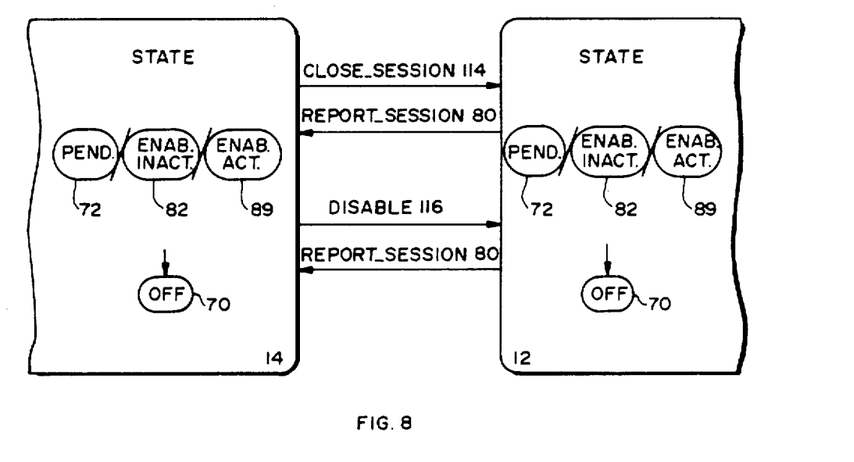

The protocol provides a CLOSE_SESSION command 114 to close a session 86a, b, ... n, as is illustrated by FIG. 8. A Session ID parameter, in the parameter fields 47, (FIG. 2,) is transmitted with this command 114 to indicate which session 86a, b ... n is being closed. A Reason Code parameter is transmitted with this command, in the parameter fields 47 after the Session ID parameter, to indicate the reason the session is being closed. If the session is being closed as a result of a normal operation, the system receiving the command can discard all session information. Alternatively, if a session is terminated abnormally, such as, for example, by a power failure, the system receiving the command saves the session information, including the mappings and the available transmit credits, since there may be a later attempt to reactivate the session. After the receiving systems performs the close session process, it transmits a REPORT_SESSION command 80.

A DISABLE command 116 is used to terminate use of the protocol. A pre-set, constant Disable parameter is sent with this command 116, in the parameter fields 47, (FIG. 2,) to minimize the possibility another command or signal will be misinterpreted as a command to terminate operation under the protocol. After the system receiving the DISABLE command 116 has completed the disabling process, it transmits a REPORT_SESSION command 80. After the transmitting system receives the REPORT_SESSION command 80, it will transfer into the OFF state 70. After the receiving system, the one that received the DISABLE command 116, transmits the REPORT_SESSION command 116, it will enter the OFF state 70.

It is apparent that the REPORT_SESSION command 80 is used in a number of situations as in acknowledgement to verify that other commands have been properly received by receiving system. In addition to a specific operation code field 46, each REPORT_SESSION command 80 includes Command Code, Session ID, and Status parameters in parameter fields 47, (FIG. 2). The Command Code parameter identifies the specific command the REPORT_SESSION is being sent in response to, and the Session ID identifies the session 86a, b, ... or n the command was sent in reference to. The Status parameter indicates if the operation required by the command was successfully completed, why the command cannot be completed, or the status of a particular session.

Both the host system 12 and the transmitting system 14 generally wait until a REPORT_SESSION command 80 is received indicating successful execution of its previously-transmitted command, before they will take further action. This insures that transmitting system does not take unilateral action after a command is sent that the receiving system is not ready for. An exception is that REPORT_SESSION commands 80 are not sent in response to ADD_CREDIT commands 94 since the continued transmission of the data fields 42 functions as an acknowledgement that the transmit creodits 92a, b, ... or n have been received.

In accordance with this protocol, each session management facility 32, 34 is set to expect a small delay between the time a command is sent and a REPORT_SESSION command 80 is received. This is to account for normal line and processing delays. However, if a REPORT_SESSION is not received, or indicates the command was not successfully executed, the transmitting session managment facility 32 or 34 retransmits the command a number of times, so that any momentary line or processing errors which occur are not misinterpreted as a breakdown of the session management connection between the host system 12 and terminal system 14. In one embodiment, most commands are retransmitted up to three times if no response is received. On the other hand, if no responsive REPORT_SESSION command 80 is received within 10 seconds of the time of the first transmission, or if the response indicates the command cannot be executed, the situation will be classified as a breakdown of the session management connection. The session management facilities 32, 34 will then take appropriate action, or display the appropriate indication, in accordance with another protocol, not part of this invention.

In addition to the commands sent between the session managment facilities 32 and 34, each facility must maintain protocol state information. Table 1 lists the state information that is maintained by each session management facility 32 and 34 for the protocol, and TABLE 2 lists the state information that is maintained for each open session. The state information is used by the session management facilities 32 and 34 to control and direct the flow of information in the data fields 42 between the application processes 20, 22, 24 and the virtual terminals 26, 28, 30.

TABLE 1

| Session Management Protocol State Information | |
|---|---|
| STATE INFORMATION | CONTENT |
| RECEIVED_COMMAND_BUFFER | To store received commands while previously received commands are processed. The size of the buffer is a function of the speed of command execution. |
| ENABLE_STATUS | Representative of the protocol's status within the system. |
| ACTIVE_TRANSMIT_SESSION | Identifies the session the system currently is transmitting a character stream to. |
| ACTIVE_RECEIVE_SESSION | Identifies the session the system currently is receiving a character stream from. |
| LAST_COMMAND_SENT | Indication of the last command transmitted by the session management facility. This is used for the purpose of receipt verification, time-out, and retransmission. |

TABLE 2

| Open Session State Information | |
|---|---|
| STATE INFORMATION | CONTENT |
| SESSION_ID | Session Identifier |
| OPEN_STATUS | Indicates session status. |
| SESSION_NAME | Name of session. This array may be empty depending on the contents of the OPEN_SESSION Session Name parameter. |
| SESSION_APPLICATION | Application of session. This array may be empty depending on the contents of the OPEN_SESSION Name parameter. |
| TRANSMISSION_CREDIT | A cumulative value indicating the number of characters which the system may transmit for the session. This value is incremented when transmission credits are received; decremented when a character is transmitted; and set to zero when a ZERO_CREDIT command is received. |

TABLE 2-continued

Open Session State Information

| STATE INFORMATION | CONTENT |
| --- | --- |
| RECEIVE_CREDIT | A cumulative value indicating the amount of receiver buffer space currently available which has been extended as transmission credits. The value should be initialized to zero when the session is opened; incremented when transmission credits are sent; decremented when characters are received; and set to zero when a REPORT_SESSION response is received in response to a ZERO_CREDIT command. |
| RECEIVE_DA-TA_BUFFER | A buffer to accept received data characters. Transmission credits are extended based on the size of this buffer. Ideally, it should be twice the size of the maximum value for RECEIVE_CREDIT to allow for possible data overage. |
| LAST_COM-MAND_SENT | An indication of the last command transmitted for this session. This code is used for the purpose of receipt verification, time-out, and retransmission. |

As previously described, the command introducer field 45 serves as a flag so the receiving session management facility 32 or 34 can detect the start of a protocol command. This feature is used when the session management protocol is contained in accordance with EN-ABLED, ACTIVE state 89 and either data fields 42 or command fields 44 may be transmitted over the communication link 16.

Figure 9:
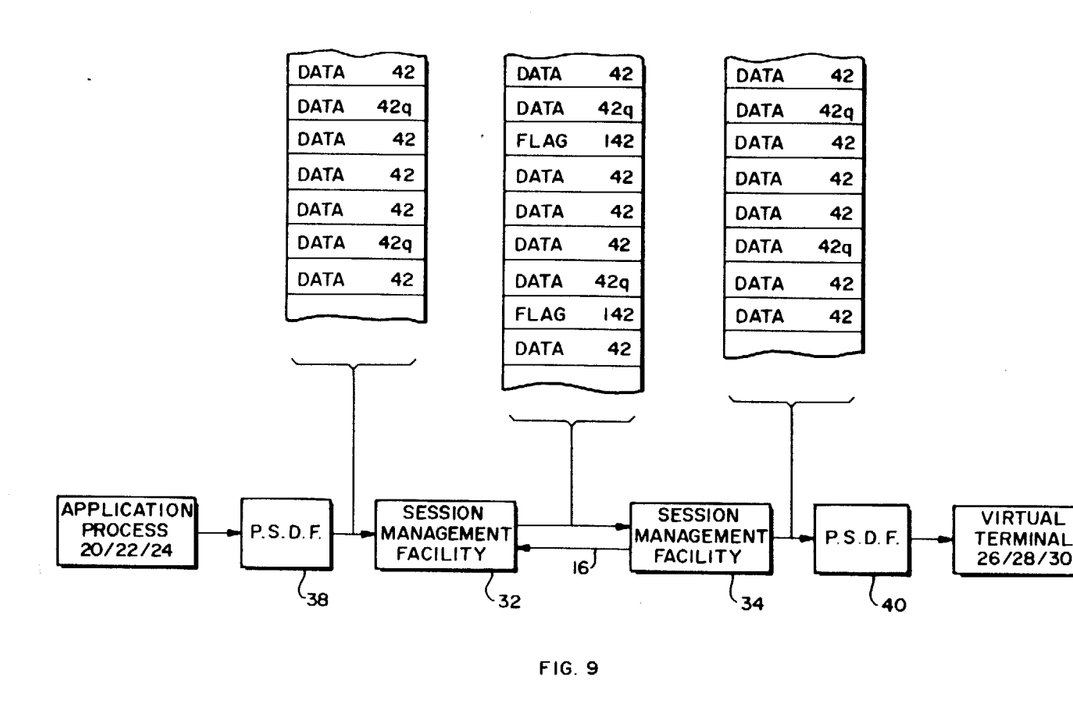
FIG. 9 is a diagram depicitng the byte structure of data in which stuffing has occurred in transmission of information between systems in accordance with this protocol.

When the session management protocol is in the EN-ABLED, ACTIVE state 89, if the information transmitted in one of the data fields 42 is identical to the command introducer field 45, the session managment facilities 32, 34 "byte stuff" the the data fields prior to their transmission over the communications link 16, as depicted in FIG. 9. This prevents information information that is being transmitted between the application processes 20, 22, 24 and the virtual terminals 26, 28 30 from being misinterpreted as protocol commands. Byte stuffing occurs when information in a data field 42q is identical to the command introducer field 45 and is transmitted between the host system 12 and the terminal system 14. The transmitting session managment facility inserts, or stuffs, a flag field 142 immediately after the data field 42q, and both are transmitted over the communications link 16.

The flag field 142 serves as a signal to the receiving session management facility 34 or 32 that the preceeding field 42q was a part of the information transmitted in the data fields 42 between the host system 12 and the terminal system 14, and not a command introducer field 45. The receiving session managment facility removes the flag field 142 prior to forwarding the information to the receiving prentation data syntax facility 40 or 38. The removal of the field 142 insures that the receiving virtual terminal 26, 28, or 30, or application process 20, 22, or 24, is presented with information that is identical to that transmitted to it.

There are a number of advantages to providing session managment between a host system 12 and a terminal system 14 in accordance with this protocol. After a session 86A, B . . . and has been open and selected, the transmitting session managment facility does not send any other protocol commands to the receiving facility. Information may be continuously sent in the data fields 42, and their transmission not interrupted by the transmission of command fields 44. This increases the time available for transmission of information between the host systems 12 and the terminal system 14.

The use of the transmit credits 92 contributes to the efficiency of session managment according to this protocol. The extending of transmit credits insures that the neither the host system 12 or the terminal system 14 transmit information more rapidly than the receiving system can receive buffer and use it. Moreover, ADD_CREDIT commands 94 are not acknowledged. There is no need to interupt the transmission of information in the data fields 42 to respond to receipt of ADD_CREDIT commands 94. Thus, the transmission of the data fields 42 does not have to be resynchronized each time an Add Credit command is received.

Moreover, since the session management commands each are preceeded by a command introducer field 45, so none of the information transmitted in the data fields 42 between the host system 12 and the terminal system 14 can be misinterpreted by the session managment facilities 32 and 34 as protocol commands. If information similar to the command introducer field 45 is transmitted between the the host system 12 and terminal system 14, the transmitting session management protocol facility will recognize it as such and stuff a flag field 142 behind it; the receiving session management facility 34 or 32 will recognize the flag field and unstuff it before the information reaches the recipient application process 20, 22, 24 or virtual terminal 20, 22, 24. Thus, the transmission of information in accordance with this protocol allows all forms of information to pass between the application processes 20, 22, 24 and the virtual terminals 26, 28, 30 over the communications link 16. This includes the transmission of data to and from application processes 20, 22, 24 on the host system 12, and the transmission of command instructions used to control the application processes.

Synchronization of session management connection between the host system 12 and the terminal system 14 is maintained, in part, by use of the REPORT_SESSION command 80. that is part of this protocol. This is because neither the host system 12 or the terminal system 14 will take action until it receives a response indicating that the other system is ready for the action. For instance, after selecting a session, a transmitting system will not start transmitting data fields 42 until it receives a REPORT_SESSION command 80 indicating that the receiving system can accpet them. This insures neither system taking will take unilateral action that could result in the loss or erroneous transmission of information.

Another advantage of session managment in accordance with this protocol is the capability of restoring session management through the restore sessions process. This insures rapid recover if either the host system 12 or terminal system 14 breakdown and lose session management information. Also, the RESET_SESSION command 110 makes it possible to rapidly resynchronize session management between the host system 12 and the terminal system 14 if session management information is lost for just one, or all of, the sessions 86.

Moreover, it is relatively economical to implement session management control between a host system 12 and a terminal systems 14 in accordance with this protocol. It may be used with any connected host system and terminal 14 that have relatively modest processing capabilities.

It is understood that this description is for the purpose of illustration only. Certain changes may be made in the above application without departing form the scope of the invention. For example, at a minimum, the protocol could be implemented in a situation where it responds to all commands and one system can only transmit SELECT_SESSION, ADD_CREDIT, ZERO_CREDIT, and VERIFY_CREDIT commands.

Moreover, the host system 12 and the terminal system 14 do not have to always include the specific components and operating sub-systems as described. One or more of the application processes 20, 22, 24 on the host system 12 may be a terminal device, and one or more of the virtual terminals 26, 28, 30 on ther terminal system 14 may be an application process or other automated nor semi-automated component.

Alternatively, some versions of the protocol there may have an alternate scheme to insure data transparency. Therefore, it is intended that all matter contained in the above description or shown in the accompanying drawings be interpreted as illustrative and not in a limiting sense. It is also understood that the following claims are intended to cover all of the generic and specific features of the invention herein described.

What is claimed as new and desired to be secured by Letters Patent of the United States is:

1. A session management link for interconnecting a host system having at least one application process to a terminal system having at least one virtual terminal, thereby to effect the transmission of information between a selected virtual terminal and a selected application process, said link including:
    A. communications link means between said host and terminal systems for transferring information therebetween;
    B. host system session management facility means connected between said application processes and said communications link for transmitting information from said application processes over said communications link, and for generating a plurality of terminal session management commands and transmitting said terminal session management commands over said communications link, one type of said terminal session management command comprising a terminal select session command, each said terminal select session commands identifying a selected interconnection to a virtual terminal; and
    C. terminal system session management facility means connected between said communications link and said virtual terminals for receiving said information and said terminal session management commands transmitted from host system session management facility over said communications link, and continually directing to the selected virtual terminal all said information sent after a terminal select session command is received until a next different terminal select session command is received, so that a single terminal select session command directs all of said following information received by said terminal system session management facility means to the selected virtual terminal until said next different terminal select session command for directing said information to a different selected virtual terminal is received.

2. The session management link of claim 1 further including:
    A. said communications link allowing simultaneous, bi-direction transfer of information between said host and terminal systems;
    B. said terminal system session management facility means transmitting information from said virtual terminals over said communications link, and generating a plurality of host session management commands and transmitting said host session management commands over said communications link, one type of said host session management command comprising a host select session command, each of said host select session commands identifying a selected interconnection to an application process; and
    C. said host session management facility means receiving said information and said host session management commands from said terminal session management system transmitted over said communications link, and continually directing to the selected application process all information sent after a host session select command is received until a next different host select session command is received, so that a single host select session command directs all of said following information received by said host system session management facility means to the selected application process until said next different host select session command for directing said information to different selected application process is received.

3. The session management link of claim 2 further including:
    A. said terminal system session management facility means transmitting a terminal session transmit credit command to said host session management facility means over said communications link, said terminal session transmit credit command defining a number of terminal transmit credits represenative of the amount of information said terminal system can accept for a selected interconnection to a virtual terminal; and
    B. said host session management facility means maintaining a pool of available transmit credits for each of the said interconnections to said virtual terminals, adding the terminal transmit credits received for each virtual terminal interconnection to the pool of available credits for the interconnection, transmitting said information to said selected virtual terminal in units equivalent to said terminal transmit credits, deducting a terminal transmit credit for each unit of information transmitted from the pool of available terminal transmit credits for said selected interconnection to said virtual terminal, and inhibiting the transmission of said information when an arbitrary amount of available transmit credits is reached for said selected interconnection.

4. The session management link of claim 3 further including:
    A. said host system session management facility means transmitting a host session transmit credit command to said terminal session management facility means over said communications link, said host transmit credit command defining a number of host transmit credits representative of the amount of information said host system can accept for a selected interconnection to an application process; and B. said terminal session management facility means maintaining a pool of available transmit credits for each of the said interconnections to said application process, adding the host transmit credits received for each application process interconnection to the pool of available credits for the interconnection, transmitting said information to said selected application process in units equivalent to said host transmit credits, deducting a host transmit credit for each unit of information transmitted from the pool of available transmit credits for the selected interconnection to said application processes, and inhibiting the transmission of said information when an arbitrary amount of transmit credits is reached for the selected interconnection.

5. The session management link of claim 4 further including:
A. said host system session management facility means transmitting said host session transmit credit commands as said terminal session management commands, said information and said terminal session management commands transmitted in random sequence over said communications link, each of said terminal session management commands including a command introducer field followed by a command code field; and
B. said terminal system session management facility means processing as terminal session commands commands that include said command introducer field followed by said command code field, and otherwise recognizing all transmissions from said host system session management facility means as said information to be directed to said selected virtual terminal in response to said terminal select session command.

6. The session management link of claim 5 further including:
A. said terminal system session management facility means transmitting said terminal session transmit credit commands as said host session management commands, said information and said host session management commands transmitted in random sequence over said communications link, each of said host session management commands including a command introducer field followed by a command code field; and
B. said host system session management facility means processing as host session commands commands that include said command introducer field followed by said command code field, and otherwise recognizing all transmissions from said terminal system session management facility means as said information to be directed to said selected application process in response to said host select session command.

7. The session management link of claim 4 further including said host system session management facility means receiving said terminal session transmit credit commands without transmitting an acknowledgement in response thereto; and said terminal system session management facility means receiving said host session transmit credit commands without generating an acknowledgement in response thereto.

8. The session management line of claim 6 further including:
(A) said host system session management facility means generating at least one open terminal session terminal session management command, each of said open terminal session commands identifying a selected interconnection to one of said virtual terminals; and
(B) said terminal system session management facility means opening an interconnection to said selected virtual terminal in response to receiving an open terminal session command, and only directing information sent after a terminal select session command is received to the selected virtual terminal if the selected interconnection to said selected virtual terminal specified by the terminal session select command is opened.

9. The session management link of claim 8 further including:
(A) said terminal system session management facility means generating at least one open host session host session management command, each of said open host session commands identifying a selected interconnection to at least one of said application process; and
(B) said host system session management facility means opens a selected interconnection to said selected application process in response to receiving an open host session command, and only directing information sent after a host session select command is received to the selected application process if the selected interconnection to said application process specified by said host session select command is opened.

10. The session management link of claim 1 further including:
(A) said terminal system session management facility means generating a "successful" report host session management command after establishing a virtual terminal interconnection in response to receiving a terminal session select command; and
(B) said host system session management facility means delaying the transmission of said information and said terminal session commands to said terminal system session management facility means until receiving said "successful" report command.

11. The session management link of claim 8 further including:
(A) said terminal system session management facility means generating a "successful" report host session management command after establishing a virtual terminal interconnection in reponse to receiving a terminal session select command; and
(B) said host system session management facility means delaying the transmission of said information and said terminal session commands to said terminal system session management facility means until receiving said "successful" report command.

12. The session management link of claim 11 further including:
(A) said host system session management facility means generating a "successful" report terminal session management command after establishing an application process interconnection in response to receiving a host session select command; and
(B) said terminal system session management facility means delaying the transmission of said information and said host session management commands to said host system session management facility means until receiving said "successful" report command.

13. The session management link of claim 12 further including:
(A) said terminal system session management facility means generating a "successful" report host session management command after opening a virtual terminal interconnection in response to receiving an open terminal session command; and
(B) said host system session management facility means delaying the transmission of said information and said terminal session management commands until receiving said "successful" report session command.

14. The session management link of claim 9 further including:
(A) said host system session management facility means generating a "successful" report terminal session management command after opening an application process interconnection in response to receiving an open host session command; and
(B) said terminal system session management facility means delaying the transmission of said information and said host session management commands until receiving said "successful" report session command.

15. The session management link of claim 5 further including:
(A) said host system session management facility means further transmitting information in the form of at least one data field over said communications link to said terminal system session management, said host session management means transmitting a flag field after each data field identical to said command introducer field is transmitted
(B) said terminal system session management facility means receiving said data fields for directing same as information to said selected virtual terminal, said terminal system session management facility means recognizing each said data field identical to said command introducer field followed by said flag as a data field, and removing each of said flag fields following data fields identical to said command introducer field prior to directing said data fields.

16. The session management link of claim 6 further including:
(A) said terminal system session management facility means further transmitting information in the form of at least one data field over said communications link to said host system session management means, said terminal system session management facility means transmitting a flag field over said communications link after each data field identical to said command introducer field is transmitted; and
(B) a said host system session management facility means receiving said data fields for directing same as information to said selected application process said host system session management facility means recognizing each said data field identical to said command introducer field followed by said flag field as a data field, and removing each of said flag fields following said data fields identical to said command introducer field prior to directing said data fields.

17. The session management line of claim 1 further including:

(A) said host system session management facility means generating at least one open terminal session terminal session management command, each of said open terminal session commands identifying a selected interconnection to one of said virtual terminals; and
(B) said terminal system session management facility means opening an interconnection to said selected virtual terminal in response to receiving an open terminal session command, and only directing information sent after a terminal select session command is received to the selected virtual terminal if the selected interconnection to said selected virtual terminal specified by the terminal session select command is opened.

18. The session management link of claim 17 further including:
(A) said terminal system session management facility means generating a "successful" report host session management command after opening a virtual terminal interconnection in response to receiving an open terminal session command; and
(B) said host system session management facility means delaying the transmission of said information and said terminal session management commands until receiving said "successful" report session command.

19. A method of establishing a session management communications link for interconnecting a host system having at least one application process to a terminal system having at least one virtual terminal, the host system and terminal system connected by a communications link extending therebetween, whereby exchange of information is effected between a selected application process and a selected virtual terminal, said method including the steps of:

transmitting information from the application processes over the communications link by means of a host system session management facility connected between the application processes and the communications link;

transmitting terminal session management commands over the communications link from said host system session management facility, one of said terminal session management commands comprising a terminal select session command, each said terminal select session command identifying a selected interconnection to a virtual terminal;

receiving said information and terminal session select session command from said communications link by means of a terminal system session management facility connected between the communications link and the virtual terminal; and said terminal select session command continually directing all of the information received following a terminal select session command to the selected virtual terminal, until a next different terminal select session command is received, so that a single terminal select session command directs all of the following information to said selected virtual terminal until said next different terminal select session command for directing said information to a different selected virtual terminal is received.

20. The method of claim 19 further including information transmitted from a virtual terminal to an application process simultaneously with the transmission of information from an application process to a virtual terminal according to the steps of:

said terminal systems session management facility transmitting information from the virtual terminals over the communications link, and transmitting host session management management commands over the communications link, one of said host session management commands comprising a host select session command, each said host select session command identifying a selected interconnection to an application process;

said host system session management facility receiving said information and host session select session command from the communications link and continually directing all of the information received following a host select session command to the selected application process, until a next different host select session command is received, so that a single host select session command directs all of the following information to said selected application process until said next different host select session command for directing said information to a different selected application process is received.

21. The method of claim 19 in which:
(A) said terminal system session management facility generates a "successful" report session command and transmits same over said communications link after establishing a virtual terminal interconnection in response to receiving a terminal select session command; and
(B) said host system session management facility delays the transmissions of information and said terminal system session management commands after transmitting said terminal select session command until said "successful" report session command is received.

22. The method of claim 19 in which:
(A) said host system session management facility generates at least one open session command for transmission over said communications link, each of said open session commands identifying a selected interconnection to one of the virtual terminals; and
(B) said terminal system session management facility receives each said open session command, and in response thereto opens an interconnection to said selected virtual terminal, said terminal system session management facility further directing information sent after a terminal select session command is received to the selected virtual terminal if the selected interconnection to said selected virtual terminal specified by said terminal selected session command is opened.

23. The method of claim 22 in which:
(A) said terminal system session management facility generates at least one open session command for transmission over said communications link, each of said open session commands identifying a selected interconnection to one of the application processes and:
(B) said host system session management facility receives each said open session command, and in response thereto opens an interconnection to said selected application process, said host system session management facility further directing information sent after a host select session command is received to the selected application process if the selected interconnection to said selected application process specified by said host selected session command is opened.

* * * * *